United States Patent
Nurmi et al.

(10) Patent No.: US 11,071,312 B2
(45) Date of Patent: Jul. 27, 2021

(54) HEAT-STABLE PLANT-BASED PROTEIN-PRODUCT

(71) Applicant: VALIO LTD., Helsinki (FI)

(72) Inventors: Niko Nurmi, Helsinki (FI); Päivi Myllärinen, Helsinki (FI)

(73) Assignee: VALIO LTD, Helsinki (FI)

( * ) Notice: Subject to any disclaimer, the term of this patent is extended or adjusted under 35 U.S.C. 154(b) by 63 days.

(21) Appl. No.: 16/469,313

(22) PCT Filed: Dec. 22, 2017

(86) PCT No.: PCT/FI2017/050932
§ 371 (c)(1),
(2) Date: Jun. 13, 2019

(87) PCT Pub. No.: WO2018/115595
PCT Pub. Date: Jun. 28, 2018

(65) Prior Publication Data
US 2020/0029590 A1   Jan. 30, 2020

(30) Foreign Application Priority Data
Dec. 22, 2016  (FI) ..................................... 20166018

(51) Int. Cl.
*A23J 3/14*  (2006.01)
*A23J 3/10*  (2006.01)
*A23J 3/22*  (2006.01)
*A23J 3/26*  (2006.01)

(52) U.S. Cl.
CPC . *A23J 3/14* (2013.01); *A23J 3/10* (2013.01); *A23J 3/227* (2013.01); *A23J 3/26* (2013.01)

(58) Field of Classification Search
CPC ...... A23J 3/14; A23J 3/10; A23J 3/227; A23J 3/26
USPC ........................................................ 426/656
See application file for complete search history.

(56) References Cited

U.S. PATENT DOCUMENTS

| | | | |
|---|---|---|---|
| 3,836,678 A | 9/1974 | Leidy et al. | |
| 4,039,694 A * | 8/1977 | Giddey | A23J 3/227 426/574 |
| 4,118,520 A | 10/1978 | Visser et al. | |
| 4,880,654 A | 11/1989 | Okada | |
| 2004/0241284 A1 | 12/2004 | Schaefer et al. | |
| 2006/0019016 A1 | 1/2006 | Torcatis | |
| 2008/0260913 A1 | 10/2008 | Orcutt et al. | |
| 2010/0074989 A1 | 3/2010 | Manski et al. | |
| 2015/0351427 A1* | 12/2015 | Rose | A23J 3/14 426/574 |

FOREIGN PATENT DOCUMENTS

| | | |
|---|---|---|
| EP | 1 061 811 | 8/2004 |
| JP | 60-118146 | 6/1985 |
| JP | 2001352911 A * | 11/2001 |
| JP | 2001-352911 | 12/2001 |
| RU | 2115329 C1 | 7/1998 |
| RU | 2299587 C2 | 5/2007 |
| WO | 2014/001642 | 1/2014 |

OTHER PUBLICATIONS

Translation of JP-2001352911 (Year: 2001).*
International Search Report for PCT/FI2017/050932 dated Feb. 23, 2018, 6 pages.
Written Opinion of the ISA for PCT/FI2017/050932 dated Feb. 23, 2018, 11 pages.
Search Report for FI20166018 dated Jul. 11, 2017, 2 pages.
[Database—online] Anonymous, "Vegan Grill Sausage Ring", Mintel, Aug. 2016, 3 pages.
[Database—online] Anonymous, "Veggie Fillets", Mintel, May 2016, 2 pages.
[Database—online] Anonymous, "Red Grilling Sausages", GNPD, Oct. 31, 2015, 2 pages.
[Database—online] WPI, 2001, XP002778175, 2 pages.
Jaros et al., "Transglutaminase in Dairy Products: Chemistry, Physics, Applications", Journal of Texture Studies, vol. 37, No. 2, Apr. 6, 2006, pp. 113-155.
Kuraishi et al., "Transglutaminase: Its utilization in the food industry", Food Reviews International, vol. 17, No. 2, Feb. 2001, pp. 221-246.
Bonisch et al., "Effect of Ultra-high Temperature Treatment on the Enzymatic Cross-linking of Micellar Casein and Sodium Caseinate by Transglutaminase", Journal of Food Science, vol. 69, No. 8, pp. E398-E404.
Kolodyaznaya, Food Chemistry, Saint Petersburg, Saint Petersburg State University of Refrigeration and Food Processing Technologies, 1999, pp. 83-85.
Office Action issued in RU Application No. 2019122651 dated Dec. 21, 2020 (with partial translation explaining the relevance of Kolodyaznaya), 8 pages.
Office Action issued in EP Appln. No. 17 829 220.7 dated Dec. 23, 2020.
Decision on Grant of Patent for Invention issued by the Federal Service for Intellectual Property, Patents and Trademarks (ROSPATENT) issued in Russian Application No. 2019122651 dated Mar. 26, 2021 (7 pages) along with English language translation (5 pages).

* cited by examiner

*Primary Examiner* — Brent T O'Hern
(74) *Attorney, Agent, or Firm* — Robert P. Michal, Esq.; Carter, DeLuca & Farrell LLP

(57) ABSTRACT

The present invention relates to a heat stable plant based protein product. Particularly, the invention relates to a heat stable plant based protein product which can be used as a meat substitute that can be heated by microwaves, fried or grilled. The present invention relates also processes for producing such heat stable plant based protein products.

10 Claims, No Drawings

HEAT-STABLE PLANT-BASED PROTEIN-PRODUCT

This application is the U.S. national phase of International Application No. PCT/FI2017/050932 filed Dec. 22, 2017 which designated the U.S. and claims priority to FI Patent Application No. 20166018 filed Dec. 22, 2016, the entire contents of each of which are hereby incorporated by reference.

FIELD OF THE INVENTION

The present invention relates to a heat stable plant based protein product. Particularly, the invention relates to a heat stable plant based protein product which can be used as a meat substitute that can be heated by microwaves, fried or grilled. The present invention relates also processes for producing such heat stable plant based protein products.

BACKGROUND OF THE INVENTION

There is currently a continuous need for meat substituting protein products in the market. Meat substitutes are food products that approximate the aesthetic qualities and/or chemical characteristics of certain types of meat. Meat substitutes include, i.a., various vegetarian products, such as soybean flour, soybean sausages, tofu, tempeh, quorn, or meatless-based alternatives, such as minced soy protein TSP (textured soy protein), or bean curd, etc. The meat substitute does not contain meat or any component of meat origin but can be used as meat, like fried.

Presently in the market, there are vegetable protein products produced from broad bean, soy bean and oat, for example, which can be used as meat substitutes.

BRIEF DESCRIPTION OF THE INVENTION

The present invention relates to a heat stable plant based protein product in the form of a block, a cube, a mince, a slice, a stripe, a grain, a block pressed from the cubes, minces, slices, stripes and/or grains which can be eaten as such or used as a meat substitute like minced meat or meat after frying and grilling, for example. The texture of the heat stable plant based protein product is not thermoplastic. The heat stable plant based protein product of the invention does not melt when fried and/or do not scorch onto frying ware when fried.

The protein content of the heat stable plant based protein product of the present invention varies within a range of about 10% to about 55%. The carbohydrate content of the heat stable plant based protein product of the present invention varies within a range about 2% to about 40%. The dry matter content of the heat stable plant based protein product of the present invention varies within a range about 30% to about 70%. The pH of the heat stable plant based protein product of the present invention is in the range of about 5.2 to about 6.5.

In addition, the present invention relates to a process for manufacturing a heat stable plant based protein product. In one embodiment, the process for manufacturing the heat stable plant based protein product of the present invention comprises the steps of:
a) providing a plant based protein concentrate,
b) providing a hydrocolloid raw material,
c) optionally providing a protein crosslinking enzyme,
d) mixing the plant based protein concentrate and the hydrocolloid raw material to form a product mass,
e) subjecting the mass to a heat treatment,
f) cooling the heat treated mass,
g) optionally adding a protein crosslinking enzyme to the mass,
h) optionally adding a protease to the mass,
i) optionally adjusting the pH of the product to a range of 5.2 to 6.5,
j) optionally cutting the formed product mass into desired form, such as a block, a cube a stripe, a mince, a grain or a slice,
k) optionally seasoning and/or packing the product mass.

In one embodiment, the process for manufacturing the heat stable plant based protein product of the present invention comprises additional the steps of providing a native casein concentrate, providing a cheese and/or a crumbling the cheese.

In one embodiment, the process for manufacturing the heat stable protein product of the present invention comprises an additional step of:
a1) manufacturing the plant based protein concentrate,
a2) manufacturing the cheese, and/or
a3) manufacturing the native casein concentrate.

The objects of the invention are achieved by methods and compositions characterized by what is stated in the independent claims. The preferred embodiments of the invention are disclosed in the dependent claims.

DETAILED DESCRIPTION OF THE INVENTION

In the present invention, it was surprisingly found that a heat stable plant based protein product can be obtained using raw materials comprising a plant based protein concentrate, a hydrocolloid and optionally a protein crosslinking enzyme. The obtained product can be used as such or in the form of a block, a cube, a mince, a stripe, a slice or a grain, all being stable for heating on a frying-pan or by microwaves.

Thus, the invention is based on a finding that using a plant based protein concentrate, a hydrocolloid, and optionally a protein crosslinking enzyme a heat stable plant based protein product can be produced. In addition, the invention is based on a finding that using a plant based protein concentrate, a hydrocolloid, a protein crosslinking enzyme and a conventional ripened cheese in crumbled form and/or a native casein concentrate, a heat stable plant based protein product can be produced. The product obtained in the present invention does not melt when fried on a hot fry-pan or a grill or when heated with microwaves. The product can also be frozen before frying and it stays heat stable.

Accordingly, the present invention relates to a process for manufacturing a heat stable plant based protein product comprising the steps of:
a) providing a plant based protein concentrate,
b) providing a hydrocolloid raw material,
c) optionally providing a protein crosslinking enzyme,
d) mixing the plant based protein concentrate and the hydrocolloid raw material to form a product mass,
e) subjecting the mass to a heat treatment,
f) cooling the heat treated mass,
g) optionally adding a protein crosslinking enzyme to the mass,
h) optionally adding a lactase and/or a protease to the mass,
i) optionally adjusting the pH of the product to a range of 5.2 to 6.5, j) optionally cutting the formed product mass into desired form, such as a block, a cube, a stripe, a mince a grain or a slice, k) optionally seasoning and/or packing the product mass.

In one embodiment, the present invention relates to a process for manufacturing a heat stable plant based protein product comprising the steps of:
a) providing a plant based protein concentrate,
b) providing a hydrocolloid raw material,
c) providing a protein crosslinking enzyme,
d) mixing the plant based protein concentrate and the hydrocolloid raw material to form a product mass,
e) subjecting the mass to a heat treatment,
f) cooling the heat treated mass,
g) adding a protein crosslinking enzyme to the mass,
h) optionally adding a lactase and/or a protease to the mass,
i) optionally adjusting the pH of the product to a range of 5.2 to 6.5,
j) optionally cutting the formed product mass into desired form, such as a block, a cube, a stripe, a mince a grain or a slice,
k) optionally seasoning and/or packing the product mass.

In one embodiment, the present invention relates to a process for manufacturing a heat stable vegetable protein product comprising the steps of:
a) providing a plant based protein concentrate,
b) providing a hydrocolloid raw material,
c) providing a protein crosslinking enzyme,
d) providing crumbled cheese and/or a native casein concentrate,
e) mixing the plant based protein concentrate, the hydrocolloid raw material and optionally the casein concentrate and/or the crumbed cheese to form a product mass,
f) subjecting the mass to a heat treatment,
g) cooling the heat treated mass,
h) adding a protein crosslinking enzyme to the mass,
i) optionally adding a lactase and/or a protease to the mass,
j) optionally adjusting the pH of the product to a range of 5.2 to 6.5,
k) optionally cutting the formed product mass into desired form, such as a block, a cube, a stripe, a mince a grain or a slice,
l) optionally seasoning and/or packing the product mass.

In one embodiment, the process for manufacturing the heat stable plant based protein product of the present invention comprises the steps of:
a) providing a plant based protein concentrate,
b) providing a hydrocolloid raw material,
c) providing a protein crosslinking enzyme,
d) providing a cheese and/or a native casein concentrate,
e) crumbling the cheese,
f) mixing the plant based protein concentrate, the hydrocolloid raw material and the casein concentrate and/or the crumbled cheese to form a product mass,
g) subjecting the mass to a heat treatment,
h) cooling the heat treated mass,
i) adding a protein crosslinking enzyme to the mass,
j) optionally adding a lactase and/or a protease to the mass,
k) optionally adjusting the pH of the product to a range of 5.2 to 6.5,
l) optionally cutting the formed product mass into desired form, such as a block, a cube, a stripe, a mince a grain or a slice,
m) optionally seasoning and/or packing the product mass.

In one embodiment, the process for manufacturing the heat stable protein product of the present invention comprises an additional step of:
a1) manufacturing a plant based protein concentrate,
a2) manufacturing a cheese, and/or
a3) manufacturing a native casein concentrate.

Accordingly, in one embodiment, the process for manufacturing the plant based protein product of the present invention comprises the steps of:
a1) manufacturing a plant based protein concentrate,
   a) providing a hydrocolloid raw material,
   b) optionally providing a protein crosslinking enzyme,
   c) mixing the plant based protein concentrate and the hydrocolloid raw material to form a product mass,
   d) subjecting the mass to a heat treatment,
   e) cooling the heat treated mass,
   f) optionally adding a protein crosslinking enzyme to the mass,
   g) optionally adding a protease to the mass,
   h) optionally adjusting the pH of the product to a range of 5.2 to 6.5,
   i) optionally cutting the formed product mass into desired form, such as a block, a cube, a stripe, a mince, a grain or a slice,
   j) optionally seasoning and/or packing the product mass.

In one embodiment, the process for manufacturing the plant based protein product of the present invention comprises the steps of:
a1) manufacturing a plant based protein concentrate,
a2) manufacturing a cheese, and
a3) manufacturing a native casein concentrate,
   a) crumbling the cheese,
   b) providing a hydrocolloid raw material,
   c) providing a protein crosslinking enzyme,
   d) mixing the plant based protein concentrate, the crumbled cheese, the casein concentrate and the hydrocolloid raw material to form a product mass,
   e) subjecting the mass to a heat treatment,
   f) cooling the heat treated mass,
   g) adding a protein crosslinking enzyme to the mass,
   h) optionally adding a lactase and/or protease to the mass,
   i) optionally adjusting the pH of the product to a range of 5.2 to 6.5,
   j) optionally cutting the formed product mass into desired form, such as a block, a cube, a stripe, a mince, a grain or a slice,
   k) optionally seasoning and/or packing the product mass.

In the present invention, the plant based protein can be derived from any eatable plant (s). In one embodiment, the plant based protein is selected from wheat protein, oat protein, soy protein, potato protein, lupine protein, flax protein, hemp protein, corn protein, barley protein, rye protein, pea protein, bean protein, spirulina protein, or a mixture thereof.

In one embodiment, the plant based protein concentrate is produced from oat protein and/or potato protein.

In the present invention, the plant protein molecules in the plant based protein concentrate are in their native/intact form. The plant based protein concentrate can be produced using methods and techniques known to a person skilled in the art. In one embodiment, the oat protein can be treated with an enzyme treating beta-glucan, such as Filtrase™ (DSM) and/or Brewers Compass® enzyme (DSM), for example, in order to reduce the viscosity.

In one embodiment, the native casein concentrate is produced from a milk raw material, such as skimmed milk by different membrane techniques, such as microfiltration, ultrafiltration, nanofiltration, reverse osmosis or their combinations. The membrane filtrations, such as ultrafiltration and microfiltration, can be performed with diafiltration technique. The filtration techniques are carried out utilizing methods known to the person skilled in the art. In one embodiment, the casein concentrate is produced from skimmed milk by microfiltration. The microfiltration of the milk raw material retains major portion of the casein in the retentate whereas major portion of the whey proteins passes into the permeate. The casein concentrate thus produced can be further concentrated by ultrafiltration. In one embodiment, the casein concentrate is produced from skimmed milk by microfiltration and ultrafiltration. In one embodiment, the casein concentrate is produced from skimmed milk by microfiltration and evaporation. In one embodiment, the casein concentrate is produced from skimmed milk by microfiltration, evaporation and spray or freeze drying. The casein molecules maintain their native form in the filtration procedures.

In one embodiment, the casein concentrate contains about 8.5%-about 20% (w/w) caseins, the total protein content being about 9.15%-about 22% (w/w). In one embodiment, the casein concentrate contains about 8.5% (w/w) caseins, the total protein content being about 9.15% (w/w), about 0.08% (w/w) fat, about 0.7% (w/w) carbohydrates, about 0.4% (w/w) lactose, about 0.85% (w/w) ash, about 2500 mg/kg calcium and 80 mg/kg sodium. The casein concentrate can be in the form of a liquid concentrate or a powder. In one embodiment, the native casein concentrate is in a liquid form. In one embodiment, the native casein concentrate is in a powder form. The native casein concentrate powder contains about 70.3% caseins, the total protein content being about 76.3%, about 3.3% lactose, the total carbohydrate content being 5.8%, about 0.7% fat, about 20800 mg/kg calcium, about 660 mg/kg sodium, and about 7.1% ash.

In the present invention, the cheese can be any type of ripened cheese. In the present invention, the cheese is produced by traditional manufacturing technology by using both rennet and starters. Ready cheese block is salted in brine or surface salted. In the present invention, cheese can be also produced by using instead of starters chemical acidification together with rennet. The ROV of the cheese (moisture on the fat free basis, MFFB) can vary widely. The ripening time of the cheese is not limited. The level of fat can typically vary from 10 to 30% and the salt content can be in the range of 0.7-1.7%.

In the present invention, the hydrocolloid raw material is selected from pectin, gelatin, starch, starch hydrolysates, xanthan gum, gum arabic, guar gum, gellan gum, acacia, agar agar, alginates, konjac, mannan, pullulan, carob, beta glucan, carrageen, polydextrose, cellulose and/or cellulose derivatives. The amount of the hydrocolloid(s) used in the process depends on the characteristics of the hydrocolloid(s) and/or amounts of the other components of the protein product, for example. The protein product of the present invention contains at least one hydrocolloid. In one embodiment, the hydrocolloid is calcium alginate or sodium alginate. In one embodiment, the amount of the hydrocolloid is in the range of 0.5-10% (w/w) based on the weight of the composition of the protein product. In one embodiment, the amount of the hydrocolloid is in the range of 1.8 to 4.3% (w/w) based on the weight of the composition of the protein product. In one embodiment, the amount of the hydrocolloid is about 4.1% (w/w) based on the weight of the composition of the protein product. In one embodiment, the amount of the hydrocolloid is about 1.8% (w/w) based on the weight of the composition of the protein product.

The product mass is formed by mixing the plant based protein concentrate, the hydrocolloid raw material and optionally the casein concentrate and/or the crumbed cheese. Mixing by stretching effects the fibre formation. Mixing may be done for example by a double screw cooking mixer or a cooking extruder without limiting to these. In one embodiment of the present invention the mixture of the plant based protein concentrate, the hydrocolloid raw material and optionally the crumbled cheese and/or the casein concentrate is subjected to a heat-treatment before the addition of a protein crosslinking enzyme. In one embodiment of the present invention the mixture of the plant based protein concentrate, the hydrocolloid raw material and optionally the crumbled cheese and/or the casein concentrate is subjected to a heat-treatment after the addition of a protein crosslinking enzyme. In the method of the invention, the heat-treatment is performed using methods known per se. Typical heat-treatments include heating at a temperature of 60-99° C. In one embodiment, the heat-treatment is performed at a temperature of 85-95° C. in order to inactivate the inhibitors of the crosslinking enzymes, harmful bacteria and/or harmful enzymes present in the raw materials. The heat-treatment time varies typically from about 2 minutes to about 2 hours.

After the heat-treatment, the mixture is cooled to a temperature of about 5-55° C.

The protein crosslinking enzyme suitable for use in the method of the invention may be any enzyme that is known to crosslink proteins. These enzymes include transglutaminase, tyrosinase and laccase, for example. Said enzymes can be used alone or in any combinations with each other. The enzyme is typically used in an amount of 0.2 U enzyme/g protein to about 20 U enzyme/g protein, preferably about 2 U enzyme/g protein.

In an embodiment of the invention, the protein crosslinking enzyme is transglutaminase (EC 2.3.2.13). It is commonly known that transglutaminase catalyzes the generation of covalent linkages between the glutamine and lysine amino acid residues present in the protein molecules. Of milk proteins, caseins, in particular κ-casein, are the best substrates for a transglutaminase. β-casein, too, is rich in glutamine and lysine that the enzyme links together. Transglutaminase can be any transglutaminase commonly used in dairy industry. It can be derived from a microbial source, fungus, mould, fish and a mammal. In an embodiment of the invention, transglutaminase is isolated from a microbial source. There are several commercially available transglutaminase enzyme preparations that are suitable for use in the process of the invention. These include Activa®YG (Ajinomoto, Japan), Activa®MP (Ajinomoto, Japan), and Yiming-TG (Yiming Fine Chemicals Co., Ltd., China). In one embodiment, the enzyme preparation is in a liquid form. In one embodiment, the liquid enzyme preparation is manufactured by Valio Oy, Finland. In one embodiment, the liquid transglutaminase enzyme preparation has crosslinking activity of about 100 U/g. In one embodiment, the transglutaminase preparation is used in an amount of about 2.0-5.0 U/g protein. In one embodiment, the transglutaminase preparation is used in an amount of about 2.0 U/g protein. Optimum conditions depend on the enzyme used and they can be obtained from the manufacturers of the commercial enzymes.

In another embodiment, the crosslinking enzyme is selected from laccase and/or tyrosinase. Laccases (EC 1.10.3.2), derived from fungi and bacteria, such as, fungus *Trametes hirsute*, catalyze the crosslinking between carbohydrates and proteins (oxidation of aromatic compounds and cysteine) with applications in food processing for reduction of allergenicity, for example. Tyrosinases (EC 1.14.18.1) are enzymes which catalyzes the oxidation of phenols such as tyrosine, with applications in food processing for reduction of allergenicity, for example. Tyrosinases can be derived from a variety of plant, animal and fungal species, i.e. filamentous fungus *Trichoderma reesei*. Optimum conditions depend on the enzyme used and they can be obtained from the manufacturers of the commercial enzymes.

In one embodiment, the process comprises a step wherein lactose is hydrolysed. There are several different commercially available lactase enzymes (ß-D-galactosidases). These include for instance enzymes produced with the *Kluyveromyces fragilis* strain, such as HA lactase (Chr. Hansen A/S, Denmark), or enzymes produced with the *Kluyveromyces lactis* strain, such as Validase (Valley Research Inc., USA), Maxilact L2000 lactase (DSM, Holland) and Godo YNL (Godo Shusei Company, Japan). Optimum hydrolysis conditions depend on the used enzyme and they can be obtained from the manufacturers of the commercial enzymes.

In the step of cutting the formed product mass into desired form, such as a block, a cube, a mince, a stripe, a grain or a slice, for example, in the process of the present invention, the formulation is done using methods and equipment known to a person skilled in the art.

In step of the seasoning and/or packing the product in the process of the present invention, the product is seasoned and/or packed using methods and equipment known to a person skilled in the art. The product can be brined or salted with dry salt. Salt can be NaCl, KCl, Na-carbonate, sodium hydrogen phosphate, AIV-mix or a milk-based mineral product (dry or liquid, concentrate, brine), or a mixture thereof. The milk-based mineral product refers to, for example, a salt described in publication EP 1061811 B1, i.e. a milk mineral powder known as trademark Valio Milk Mineral Powder VMMP (Valio Oy). Other feasible milk-based mineral products include trademarks such as Capolac® MM-0525 BG (Arla Foods Ingredients), Vitalarmor CA (Armor Proteins) and Sodidiet 40 Ml (Sodiaal Industrie). The product can be seasoned with spices, herbs, fruits and/or vegetables.

The process of the invention may further contain additional optional process steps, such as adding further ingredients, such as fats, oils and/or emulsifiers, other protein and/or amino acid sources, and/or a further-processing step, for instance recovering the product in a manner characteristic to it. These optional steps are performed in an appropriate stage of the process known by a person skilled in the art. The selection of suitable optional steps and conditions belongs to knowledge of a person skilled in the art.

In one embodiment, the process of the invention comprises a step of providing a fat and/or oil. In one embodiment, the process of the invention contains a step of mixing a fat and/or oil with the plan based protein concentrate, the hydrocolloid raw material and optionally the casein concentrate and/or the crumbled cheese. In one embodiment, the fat is selected from cream and butter or a mixture thereof. In one embodiment, the oil is selected from vegetables oils such as, rape oil, sunflower oil, olive oil, a mixture thereof.

The present invention relates also to a heat stable plant based protein product, in the form a block, a cube, a mince, a grain, a slice, a stripe or block or filet pressed or processed from the cubes, minces, stripes, grains and/or slices. In one embodiment, the heat stable plant based protein product of the present invention refers to a meat substitute or a meat analogue. The heat stable plant based protein product can comprise also milk proteins. In one embodiment the heat stable plant protein product contains crosslinked casein.

The protein content of the heat stable plant based protein product can vary in the range of about 10% to about 55%. In an embodiment, the protein content is about 20% to about 50%. In an embodiment, the protein content is about 23% to about 30%.

The carbohydrate content of the heat stable plant based protein product can vary within a range of about 2% to about 40%. In one embodiment, the carbohydrate content is within a range of about 5% to about 25%.

The fat content of the heat stable plant based protein product can vary within a range of about 0% to about 20%. In one embodiment, the fat content is within a range of about 5% to about 10.0%.

The dry matter content of the heat stable plant based protein product can vary within a range of about 30% to about 70%. In one embodiment, the dry matter content is within a range of about 40% to about 60%.

In one embodiment, the protein content of the heat stable plant based protein product is about 10% to about 55% or about 20% to about 50% or about 23% to about 30% and the carbohydrate content is about 2% to about 40% or about 5% to about 25%.

In one embodiment, the protein content of the heat stable plant based protein product is about 10% to about 55% or about 20% to about 50% or about 23% to about 30%, the carbohydrate content is about 2% to about 40% or about 5% to about 25%, and the dry matter content is about 30% to about 70%, or about 40% to about 60%.

The pH of the heat stable plant based protein product is in the range of about 5.2 to about 6.5. In an embodiment, the pH of product is about 5.5 to about 6.2.

In one embodiment, the protein content of the heat stable plant based protein product is about 10% to about 55% or about 20% to about 50% or about 23% to about 30% and the pH of the product is about 5.2 to about 6.5 or about 5.5 to about 6.2.

In one embodiment, the protein content of the heat stable plant based protein product is about 10% to about 55% or about 20% to about 50% or about 23% to about 30%, the carbohydrate content is about 2% to about 40% or about 5% to about 25%, and the pH of the product is about 5.2 to about 6.5 or about 5.5 to about 6.2.

In one embodiment, the protein content of the heat stable plant based protein product is from about 10% to about 55% or from about 20% to about 50% or from about 23% to about 30%, the carbohydrate content is about 2% to about 40% or about 5% to about 25%, the dry matter content is about 30% to about 70%, or about 40% to about 60%, and the pH of the product is about 5.2 to about 6.5 or about 5.5 to about 6.2.

The protein product of the invention can be in form of a block or a fillet or a cube, a grain or a slice. The protein product can be consumed as such or heated, fried, grilled or cooked. The product does not melt and/or clump together when fried on a hot fry-pan or a grill or when heated with microwaves. Thus, the protein product of the present invention is heat stable. The product can also be frozen before frying while staying heat stable.

The following examples are presented for further illustration of the invention without limiting the invention thereto.

EXAMPLES

Example 1

Preparation of a Heat Stable Plant Based Protein Product Having a Protein Content of 30%, Carbohydrate Content of 22% and Dry Matter Content of About 56%

An oat based protein concentrate was prepared from oat flour having a protein content of 20% (Fazer Oy, Finland) by mixing it with water in a ratio of 50:50. The oat protein concentrate (72.7%) was mixed with potato protein (24%), calcium alginate (1.8%), oil (1.0%) and spices (0.5%) to provide a wellmixed mass. After this, the mass was heated with a direct steam up to a temperature of 75-99° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass can be adjusted to the desired level (5.2-6.5) with an acid or a base. The cooled mass can then be formulated into the desired form, such as a block, cubes or slices, for example, with appropriate machinery, such as mono pump and vacuum filler (VEMAG Maschinenbau GmbH). The plant based protein product does not melt and/or clump together when fried on a hot fry-pan or a grill or when heated with microwaves. The product can also be frozen before frying and it stays heat stable. The pH of the product was adjusted to pH 5.2. The plant based protein product has protein content of 30%, carbohydrate content of 22%, fat content of 2% and dry matter content of about 56%.

Example 2

Preparation of a Heat Stable Plant Based Protein Product Having Protein Content of 30%, Carbohydrate Content of 6.1%, and Dry Matter Content of About 44%

An oat based protein concentrate was prepared from oat flour having a protein content of 54% (Tate and Lyle, UK) by mixing it with water in a ratio of 40:60. The oat protein concentrate (85%) was mixed with potato protein (11%), calcium alginate (1.8%), oil (0.1%) and spices (0.5%) to provide a wellmixed mass. After this, the mass was heated with a direct steam up to a temperature of 75-99° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass can be adjusted to the desired level (5.2-6.5) with an acid or a base. The cooled mass can then be formulated into the desired form, such as a block, cubes or slices, for example, with appropriate machinery, such as mono pump and vacuum filler (VEMAG Maschinenbau GmbH). The plant based protein product does not melt and/or clump together when fried on a hot fry-pan or a grill or when heated with microwaves. The product can also be frozen before frying and it stays heat stable. The pH of the product was adjusted to pH 5.2. The plant based protein product has a protein content of 30%, a carbohydrate content of 6.1%, fat content of 5.8% and dry matter content of about 44%.

Example 3

Preparation of the Cheese

Raw milk was separated and standardized to have a fat content of 1%. Then, the milk was pasteurized at 72° C. for 15 s, cooled to a temperature of 33° C. and pumped into a cheese vat. About 0.04% by weight of CaCl2-solution (34%), about 0.05% rennet and a starter culture (DVS CH—N19) were added to the warm milk and mixed thoroughly with the milk. The mixture was allowed to curdle for about 30 minutes. The curdled milk was cut into grains with a cutting tool in the cheese vat. The grains were heated up to a temperature of 40° C. during about 100 minutes while stirring all the time. After this, the whey was separated from the grains and the grains were pressed into cheese blocks for a period of 14 hours (prepressing 4 h and repressing 10 h). After the pressing, the cheese was brined for 14 hours after which the cheese was ripened for about 21 days at a temperature of 11° C.

Example 4

Preparation of the Casein Concentrate

Raw milk was separated and the obtained skimmed milk was pasteurized at 72° C. for 15 s and cooled. The cooled skimmed milk was microfiltered at a temperature of 50° C. to provide a casein fraction. The obtained casein fraction was concentrated by evaporation and dried into a powder.

Example 5

Preparation of a Heat Stable Protein Product Having a Protein Content of 26.5% and Fat Content of 6.0% Containing Plant Based and Milk Proteins and Having Dry Matter Content of About 43%

The cheese prepared as described in Example 3 was crumbled. The crumbled cheese (18 kg), water (5 kg), the native casein concentrate powder prepared as described in Example 4 (1.5 kg), wheat protein (1.5 kg) and calcium alginate (1.1 kg) were mixed with a screw mixer (Karl Schnell) to provide an even mass. Wheat protein can be replaced, also partly, with oat protein and/or potato protein. After this, the mass was heated with a direct steam up to a temperature of 75-99° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass was adjusted to the desired level. The cooled mass can then be formulated into the desired form, such as a block, cubes or slices, for example, with appropriate machinery, such as mono pump and vacuum filler (VEMAG Maschinenbau GmbH). The protein product does not melt and/or clump together when fried on a hot fry-pan or a grill or when heated with microwaves. The product can also be frozen before frying and it stays fry-proof. The pH of the product was adjusted to pH 5.2. The protein product has a protein content of 26.5%, fat content of 6.0% and dry matter content of 43%.

Example 6

Preparation of a Heat Stable Plant Based Protein Product Having a Protein Content of 30%, Carbohydrate Content of 22% and Dry Matter Content of About 56% Without Protein Crosslinking Enzyme An oat based protein concentrate was prepared from oat flour having a protein content of 20% (Fazer Oy, Finland) by mixing it with water in a ratio of 50:50. The oat protein concentrate (72.7%) was mixed with potato protein (24%), calcium alginate (1.8%), oil (1.0%) and spices (0.5%) to provide a wellmixed mass. After this, the mass was heated with a direct steam up to a temperature of 75-99° C. in order to destroy the possible harmful bacteria, enzymes and inhibitors. The heated mixture was cooled indirectly with cold water to a desired temperature for formulating the mixture into the desired form, while stirring the mixture all the time. The pH of the mass can be adjusted to the desired level (5.2-6.5) with an acid or a base. The cooled mass can then be formulated into the desired form, such as a block, cubes or slices, for example, with appropriate machinery, such as mono pump and vacuum filler (VEMAG Maschinenbau GmbH). The plant based protein product does not melt and/or clump together when fried on a hot fry-pan or a grill or when heated with microwaves. The product can also be frozen before frying and it stays heat stable. The pH of the product was adjusted to pH 5.2. The plant based protein product has protein content of 30%, carbohydrate content of 22%, fat content of 2% and dry matter content of about 56%.

Example 7

Preparation of a Heat Stable Plant Based Protein Product Having Protein Content of 30%, Carbohydrate Content of 6.1%, and Dry Matter Content of About 44% Without Protein Crosslinking Enzyme An oat based protein concentrate was prepared from oat flour having a protein content of 54% (Tate and Lyle, UK) by mixing it with water in a ratio of 40:60. The oat protein concentrate (85%) was mixed with potato protein (11%), calcium alginate (1.8%), oil (0.1%) and spices (0.5%) to provide a well-mixed mass. After this, the mass was heated with a direct steam up to a temperature of 75-99° C. in order to destroy the possible harmful bacteria, enzymes and inhibitors. The heated mixture was cooled indirectly with cold water to a desired temperature for formulating the mixture into the desired form, while stirring the mixture all the time. The pH of the mass can be adjusted to the desired level (5.2-6.5) with an acid or a base. The cooled mass can then be formulated into the desired form, such as a block, cubes or slices, for example, with appropriate machinery, such as mono pump and vacuum filler (VEMAG Maschinenbau GmbH). The plant based protein product does not melt and/or clump together when fried on a hot fry-pan or a grill or when heated with microwaves. The product can also be frozen before frying and it stays heat stable. The pH of the product was adjusted to pH 5.2. The plant based protein product has a protein content of 30%, a carbohydrate content of 6.1%, fat content of 5.8% and dry matter content of about 44%.

Example 8

Preparation of a Heat Stable Plant Based Protein Product Having a Protein Content of 30%, Carbohydrate Content of 22% and Dry Matter Content of About 56% Using Laccase or Tyrosinase An oat based protein concentrate was prepared from oat flour having a protein content of 20% (Fazer Oy, Finland) by mixing it with water in a ratio of 50:50. The oat protein concentrate (72.7%) was mixed with potato protein (24%), calcium alginate (1.8%), oil (1.0%) and spices (0.5%) to provide a wellmixed mass. After this, the mass was heated with a direct steam up to a temperature of 75-99° C. in order to destroy the possible harmful bacteria, enzymes and inhibitors. The heated mixture was cooled indirectly with cold water to a temperature of 45° C. while stirring the mixture all the time. When the temperature is in the range of 40-45° C., a laccase enzyme produced by *Trametes hirsuta* in an amount of 6 U/g protein was added to the mass. Alternatively, tyrosinase produced by *Trichoderma reesei* was used instead of laccase in an amount of 4-9 U/g protein. After the addition of laccase or, alternatively, tyrosinase, the pH of the mass can be adjusted to the desired level (5.2-6.5) with an acid or a base. The cooled mass can then be formulated into the desired form, such as a block, cubes or slices, for example, with appropriate machinery, such as mono pump and vacuum filler (VEMAG Maschinenbau GmbH). The plant based protein product does not melt and/or clump together when fried on a hot fry-pan or a grill or when heated with microwaves. The product can also be frozen before frying and it stays heat stable. The plant based protein product has protein content of 30%, carbohydrate content of 22%, fat content of 2% and dry matter content of about 56%.

It will be obvious to a person skilled in the art that, as the technology advances, the inventive concept can be implemented in various ways. The invention and its embodiments are not limited to the examples described above but may vary within the scope of the claims.

The invention claimed is:

1. A process for manufacturing a plant based protein product, wherein the process comprises the steps of:
    a) providing a plant based protein concentrate,
    b) providing a hydrocolloid raw material selected from alginates,
    c) optionally providing a protein crosslinking enzyme,
    d) mixing by stretching the plant based protein concentrate and the hydrocolloid raw material to form a product mass,
    e) subjecting the mass to a heat treatment with a direct steam at a temperature of 85-95° C.,
    f) cooling the heat treated mass,
    g) optionally adding a protein crosslinking enzyme to the mass,
    h) optionally adding a protease to the mass,
    i) optionally adjusting the pH of the product to a range of 5.2 to 6.5,
    j) optionally cutting the formed product mass into desired form,
    k) optionally seasoning and/or packing the product mass, to provide a plant based protein product exhibiting a dry matter content between 43% and 70%.

2. The process of claim 1, wherein the process comprises a step of providing a protein crosslinking enzyme and providing a native casein concentrate and/or a crumbled cheese and mixing the plant based protein concentrate and the hydrocolloid raw material and optionally the native casein concentrate and/or the crumbled cheese in step d) to form a product mass and adding a protein crosslinking enzyme to the mass in step g).

3. The process of claim 2, wherein the native casein concentrate is provided in a powder form.

4. The process of claim 1, wherein the process comprises the steps of providing a protein crosslinking enzyme and adding it to the mass.

5. The process of claim 2, wherein the protein crosslinking enzyme is selected from transglutaminase, tyrosinase and laccase.

6. The process of claim 1, wherein the hydrocolloid is calcium alginate or sodium alginate.

7. A heat stable plant based protein product produced according to the process of claim 1.

8. The process of claim 1, wherein step j) is performed and step j) comprises cutting the formed product mass into the formed product mass is cut into a form selected from block, cube, stripe, mince, grain and slice.

9. The process of claim 1, wherein the heat treatment is carried out for about 2 minutes to about 2 hours.

10. The process of claim 1, wherein the plant based protein concentrate is selected from oat protein and potato protein and a mixture thereof.

* * * * *